March 30, 1954  W. D. EAKIN  2,673,588
METHOD OF MAKING RUBBER TIRE-TUBES
Filed Dec. 5, 1950  4 Sheets-Sheet 1

INVENTOR.
Willard D. Eakin

March 30, 1954     W. D. EAKIN     2,673,588
METHOD OF MAKING RUBBER TIRE-TUBES
Filed Dec. 5, 1950     4 Sheets-Sheet 2

INVENTOR.
Willard D. Eakin

March 30, 1954     W. D. EAKIN     2,673,588
METHOD OF MAKING RUBBER TIRE-TUBES
Filed Dec. 5, 1950     4 Sheets-Sheet 3

*INVENTOR.*
Willard D. Eakin

March 30, 1954  W. D. EAKIN  2,673,588
METHOD OF MAKING RUBBER TIRE-TUBES
Filed Dec. 5, 1950  4 Sheets-Sheet 4

INVENTOR.
Willard D. Eakin

Patented Mar. 30, 1954

2,673,588

UNITED STATES PATENT OFFICE 2,673,588

METHOD OF MAKING RUBBER TIRE-TUBES

Willard D. Eakin, Akron, Ohio

Application December 5, 1950, Serial No. 199,281

2 Claims. (Cl. 154—14)

This invention relates to procedure and apparatus for making an article of moldable, vulcanizable or hardening material having an elongated passage therein, an important example being water-expelling inner tubes for tractor tires such as are described in Steindinger U. S. Patent No. 2,307,429.

Its chief objects are commercial practicability and economy.

Of the accompanying drawings:

Fig. 1 illustrates the concurrent production of two elements, 10, 10, each adapted to be incorporated in an inner-tube prior to the vulcanization of the latter, illustrated in Fig. 6, or as a conversion element for converting an ordinary inner-tube, after its vulcanization and even after its use, to a water-expelling inner-tube, as illustrated in Fig. 5.

Figure 1:
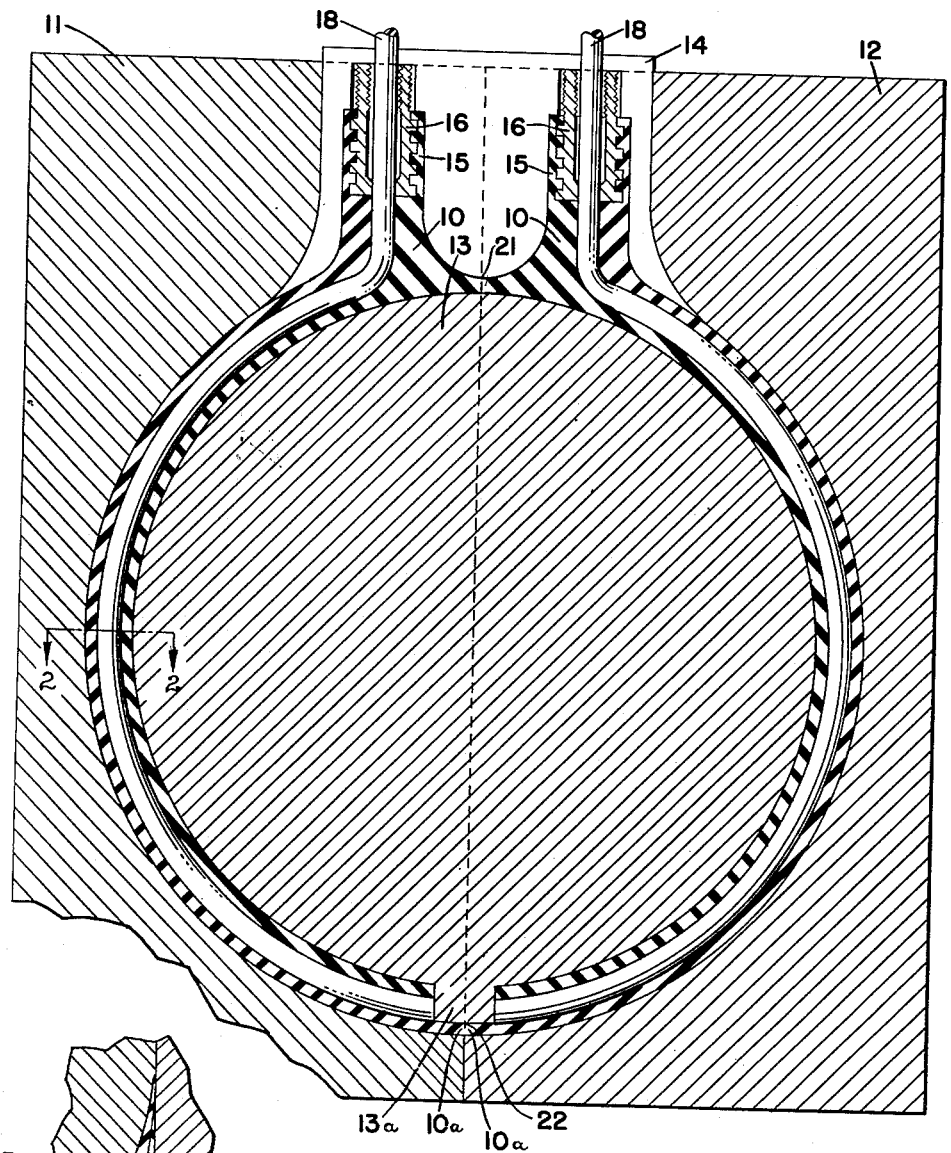
Fig. 1 is a cross-section of a mold with mandrels and the work therein illustrating one of the steps of my preferred procedure, the mold and the mandrels also embodying the invention as considered in terms of apparatus.
Figure 3:
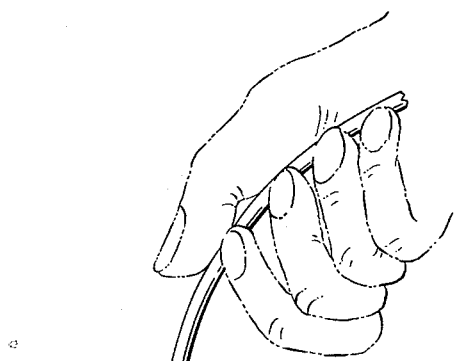
Fig. 3 is a top plan fragmentary view of the apparatus shown in Fig. 1.
Figure 3:
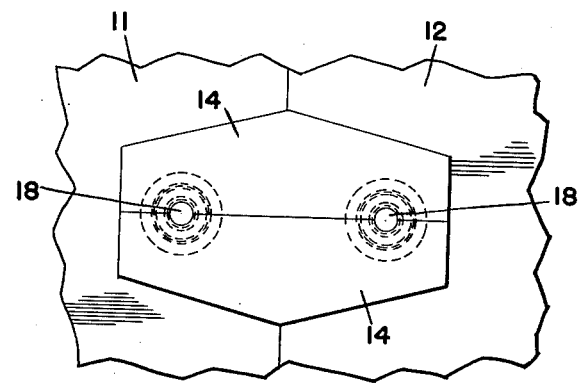

The apparatus shown in Figs. 1 and 3 comprises a pair of mold sections 11, 12 for molding the outer faces of the main body portions of the elements 10, 10, a generally cylindrical mandrel 13 for molding their inner faces, a pair of wedging type mold inserts 14, 14 for molding the outer faces of valve stem portions 15, 15 of the respective elements, which are provided with suitable metal inserts 16, 16 for the mounting of tire valves therein and for connection to an air hose or a water hose as occasion requires.

Figure 5:
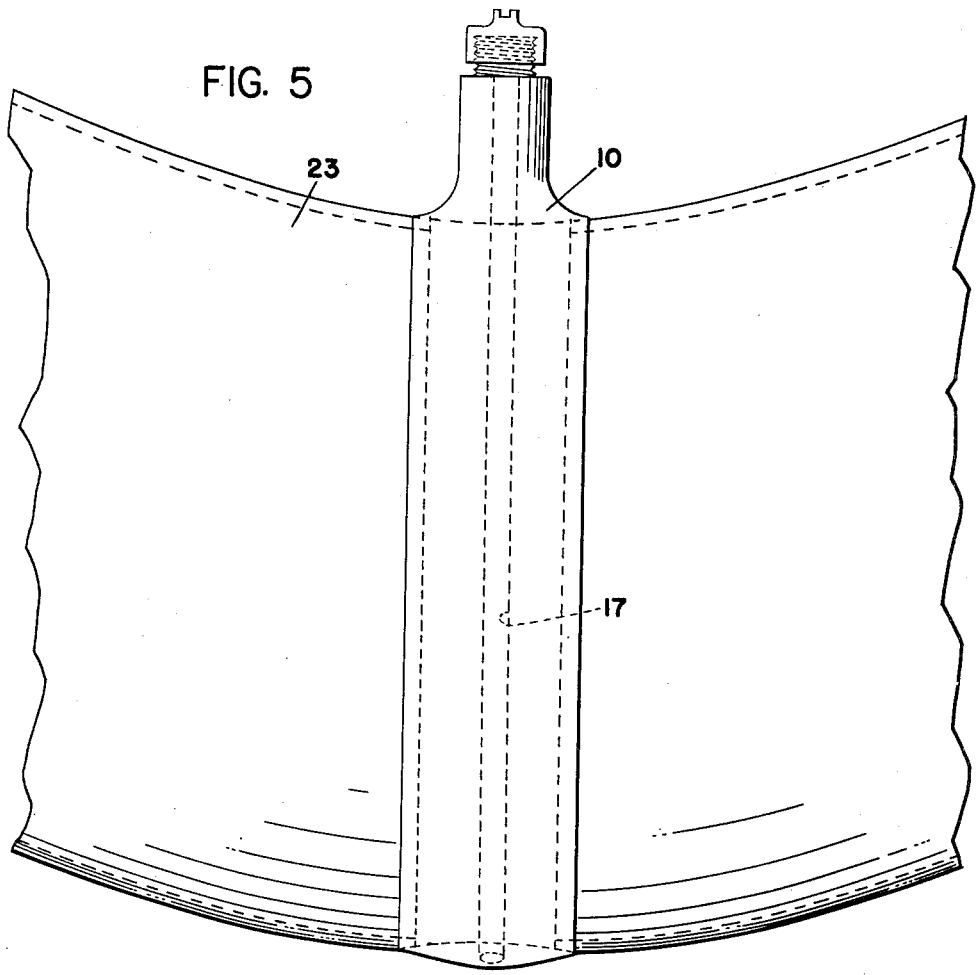
Fig. 5 is a fragmentary elevation of an inner tube having as a part of it a piece of the work such as the piece illustrated in Fig. 4.
Figures 6, 9, 10:
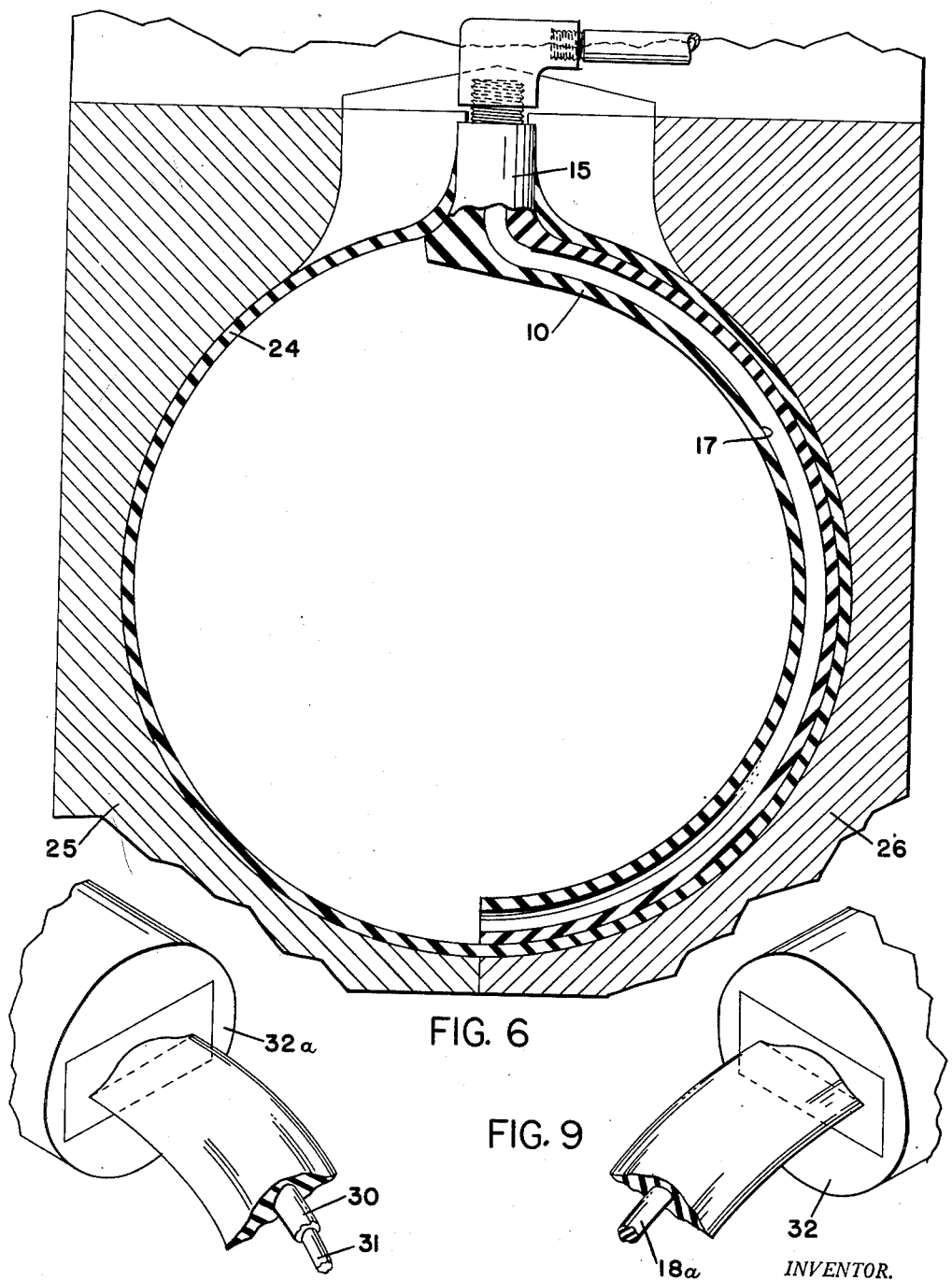
Fig. 6 is a cross-section, with broken-away parts shown in elevation, of an inner-tube vulcanizing mold with the work and a flexible and stretchable mandrel therein.
Fig. 9 is a diagrammatic perspective of part of an extruding machine with work emerging therefrom, illustrating an economical procedure for producing mandrel-and-work assemblies such as the one contemplated in Figs. 1, 4, 5 and 6.
Fig. 10 is a diagrammatic perspective view of an extruding machine with work emerging therefrom, illustrating an economical procedure for producing mandrel-and-work assemblies such as the one contemplated in either Fig. 7 or Fig. 8.

For molding a passage 17, Fig. 5 or Fig. 6, in each of the elements 10, a flexible and stretchable vulcanized-rubber mandrel or shaping member 18 is used, and the element 10 is at least roughly built upon the mandrel 18 before being placed, therewith, in the mold.

Figure 2:
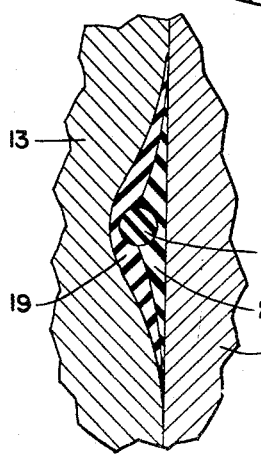
Fig. 2 is a section on line 2—2 of Fig. 1.

This can be done by "stitching" or welding together two strips of stock 19, 20, as illustrated in Fig. 2, the metal insert 16 being previously or subsequently mounted upon the mandrel 18 as shown in Fig. 1, additional stock being added as may be necessary for at least roughly building to shape the valve-stem part of the element, which can consist of a spiral wrapping of a strip of sheeted stock, stitched to the strips 19, 20 after it has been wrapped about the metal insert and the flexible and stretchable core.

During the molding operation illustrated in Fig. 1 the elements 10, 10, when of material requiring it, are vulcanized, but preferably only to a "semi-cured" condition, for good subsequent adhesion or welding to the rest of the respective inner-tubes in which they are to be incorporated.

After the molding operation is completed the pair of elements are removed from the mold and are cut apart at 21, between the valve stems, and at 22, diametrically opposite that position.

Figure 4:
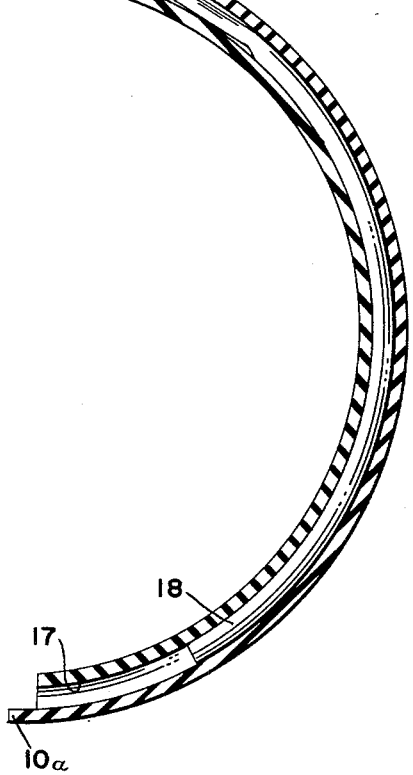
Fig. 4 is a cross-section of a piece of the work and a flexible and stretchable mandrel being withdrawn therefrom, illustrating a step of the process subsequent to the step illustrated in Fig. 1.

Either before or after their being cut apart, or even while they are still in the mold, or after they have been incorporated in respective inner tubes are illustrated in Fig. 5, the flexible and stretchable mandrels 18 are removed, as illustrated in Fig. 4, by simply pulling them out.

As the pull begins it is sustained wholly by the mandrel's adhesion, strong or weak, to the surrounding structure in a limited region nearest the pulled end of the mandrel and thus the adhesion in that limited region is easily broken, whereupon the pull is sustained by the adhesion of the next small length of adhered surfaces, which, in turn, is thus easily broken, the breaking of the adhesion thus continuing progressively from near the pulled end of the mandrel to its opposite end.

Thus the force of the pull required is only a small part of the total adhesive resistance, and is not so great as to break the mandrel even though it be of great length and of devious form.

The force of the pull immediately stretches each successive part of the mandrel as the part's local adhesion is broken, and this stretching of the mandrel by progression progressively narrows it, as shown in Fig. 4, and thus loosens it in the space that it occupied, so that it can slide easily.

The large metal mandrel 13 is shown in Fig. 1 as being formed with a peripheral projection 13ᵃ for partially closing the ends of the cavities in which elements 10 are molded, but only of such radial length as to permit the molding of an outer layer of stock, projecting as at 10ª, 10ª, beyond the flexible mandrel and the inner layer of stock, so that when the element is incorporated in an inner-tube 23, Fig. 5, as a patch closing a suitably shaped cut hole in the wall of the inner-tube, the projection of stock 10ª provides a seam margin for overlapping upon the wall of the inner-tube in the seaming of the element 10 to the inner-tube, so that the seam will be endless.

Before the element 10 is incorporated in an inner-tube any mold flash closing or partly closing the mouth of the element 10 is of course removed, by tearing or cutting.

If the element 10 is to be built into an inner-tube before the latter is vulcanized, as illustrated in Fig. 6, the projection 10ª is unnecessary and, if present, can be removed before the incorporation of the element 10 in the inner-tube.

In Fig. 6 the element 10 has been built into the inner-tube, 24, as an added internal element and during the cure the fluid for distending the tube in the mold 25, 26, is conducted into the inner-tube through the passage 17 extending lengthwise through the element 10, the mandrel 18 having been removed as above described.

Figures 7, 8:
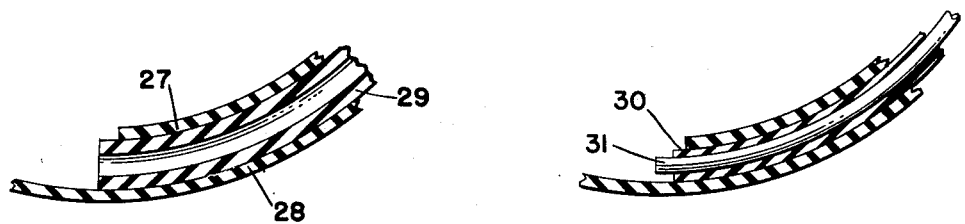
Fig. 7 is a fragmentary cross-section corresponding to a lower part of Fig. 6 but showing an alternative type of flexible and stretchable mandrel.
Fig. 8 is a view corresponding to Fig. 7 but showing another alternative type of flexible and stretchable mandrel.

Fig. 7 shows the idea of simply incorporating in the inner-tube as it is being built, between an inner layer of stock 27 and an outer layer 28, a vulcanized-rubber mandrel or shaping member 29 of tubular form having its wall thick enough to prevent its collapse, the tubular mandrel 29 being withdrawn from the inner-tube as above described with regard to the mandrel 18, after the inner-tube has been vulcanized with the tubular mandrel 29 in it and serving to conduct the distending fluid into the inner-tube in the mold-vulcanizing operation.

Fig. 8 shows the idea of building the inner-tube upon a mandrel comprising a thin-walled, vulcanized-rubber, tubular member 30 having a vulcanized solid rubber member 31 within it to keep it from collapsing, the member 31 then being withdrawn, as above described with regard to the mandrel 18, before the inner-tube is put into the vulcanizing mold, so that the tubular member 30 will have an open through passage for conducting the distending fluid into the inner-tube for mold-vulcanizing of the latter, the tubular member 30 then being withdrawn from the finished inner-tube, as above described with regard to the mandrel 18, after the inner-tube has been vulcanized, but either before or after the inner-tube has been removed from the vulcanizing mold.

In the mold-vulcanizing of the inner-tube, whether the distending fluid is conducted through one of the elements 10 that has become a part of the inner-tube, or through a hollow mandrel 29 or 30 later to be withdrawn, the pressure of the distending fluid is substantially the same in the interior and on the exterior of the fluid-conducting member, in spite of moderately rapid in-flow or out-flow of the fluid, so that there is no danger of the fluid-conducting member being collapsed by the fluid pressure, and especially if it is a partially vulcanized element 10 or a fully vulcanized tubular mandrel 29 or 30.

In fact, because of such equalization of the inside and outside pressures of the distending fluid the mandrel can be withdrawn before the raw inner-tube is put into the mold.

Adhesion-preventing substances such as a soap-stone solution or talc are of course used as needed or desired.

Fig. 9 diagrammatically shows an extruding machine 32 forming a part for an element such as the element 10 above described, a vulcanized rubber rod 18ª, to serve as the mandrel 18 above described, being passed through the extruding machine, as in the extruding of a rubber insulation upon a wire.

Fig. 10 shows a similar extruder, 32ª, forming an element to be built into an inner-tube and having in it the thin-walled, vulcanized-rubber mandrel 30 and vulcanized-rubber rod 31 of Fig. 8.

The mandrel or mandrels can be, when in unstrained condition, of either straight, curved or other form. Various modifications are possible without sacrifice of all of the advantages of the invention and without departure from the scope of the appended claims, in which the word "rubber" is intended to be inclusive of both natural and synthetic settable materials having, when in set condition, substantially the resilient deformability of vulcanized soft-rubber.

I claim:

1. The method of making a rubber tire-tube having a valve-stem and having an inlet-outlet passage which extends through the said valve-stem and from the inner end thereof extends, in the wall of the tire-tube, to a position which is remote, along the wall of the tire-tube, from said stem, and at said position is open to the interior of the tire-tube, said method comprising the steps of mounting an elongated, previously set flexible rubber shaping member in said valve-stem with a portion of the said shaping member projecting from the inner end of the said valve-stem, building a wall portion of the said tire-tube, of settable rubber composition, upon the so projecting portion of the said shaping member, and against an adjacent portion of the said valve-stem, so that integrally said composition contacts all of a surface zone of said valve-stem surrounding said shaping member and completely surrounds at least a part of the said projecting portion of said shaping member immediately adjacent said valve-stem, and then mold-setting said composition in that relationship to said valve-stem and said shaping member while said valve stem is held in angular relation to an adjacent part of said shaping member.

2. A method as defined in claim 1 in which the recited shaping member is pulled lengthwise from the recited wall portion of the tire-tube after the recited composition has been mold-set as recited.

WILLARD D. EAKIN.

References Cited in the file of this patent

UNITED STATES PATENTS

| Number | Name | Date |
|---|---|---|
| 213,581 | Mattson | Mar. 25, 1879 |
| 220,536 | Hyde | Oct. 14, 1879 |
| 1,226,470 | Coolidge | May 15, 1917 |
| 1,319,644 | Chinnock | Oct. 21, 1919 |
| 1,414,091 | Merz | Apr. 25, 1922 |
| 1,537,860 | Miller | May 12, 1925 |
| 1,619,362 | Murray | Mar. 1, 1927 |
| 1,923,736 | Lewis et al. | Aug. 22, 1933 |
| 2,230,151 | Winder | Jan. 28, 1941 |
| 2,307,429 | Steidinger | Jan. 5, 1943 |
| 2,308,268 | Corson | Jan. 12, 1943 |
| 2,310,362 | Frissell | Feb. 9, 1943 |
| 2,314,866 | Bosco | Mar. 30, 1943 |
| 2,330,370 | Miller | Sept. 28, 1943 |
| 2,414,776 | Stephenson et al. | Jan. 21, 1947 |